United States Patent

Fossum et al.

(10) Patent No.: US 7,212,199 B2
(45) Date of Patent: May 1, 2007

(54) SYSTEM AND METHOD FOR TERRAIN RENDERING USING A LIMITED MEMORY FOOTPRINT

(75) Inventors: Gordon Clyde Fossum, Austin, TX (US); Barry L Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 10/875,946

(22) Filed: Jun. 24, 2004

(65) Prior Publication Data

US 2005/0285852 A1    Dec. 29, 2005

(51) Int. Cl.
*G06T 15/00*    (2006.01)

(52) U.S. Cl. .................. 345/419; 345/418; 345/421
(58) Field of Classification Search ............... None See application file for complete search history.

(56) References Cited

OTHER PUBLICATIONS

Guedes, L., Gattass, M., Carvalho, P., Real-Time Rendering of Photo-Textured Terrain Height Fields, 1997, Campos do Jordao, pp. 1-8.*
Lee, C., Shin, Y., A Terrain Rendering Method Using Vertical Ray Coherence, Apr.-Jun. 1997, The Journal of Visulization and Computer Animation, pp. 97-114.*

* cited by examiner

*Primary Examiner*—Ulka Chauhan
*Assistant Examiner*—Said Broome
(74) *Attorney, Agent, or Firm*—Van Leeuwen & Van Leeuwen; Diana R. Gerhardt

(57) ABSTRACT

A system and method for terrain rendering using a limited memory footprint is presented. A system and method to perform vertical ray terrain rendering by using a terrain data subset for image point value calculations. Terrain data is segmented into terrain data subsets whereby the terrain data subsets are processed in parallel. A bottom view ray intersects the terrain data to provide a memory footprint starting point. In addition, environmental visibility settings provide a memory footprint ending point. The memory footprint starting point, the memory footprint ending point, and vertical ray adjacent data points define a terrain data subset that corresponds to a particular vertical ray. The terrain data subset includes height and color information which are used for vertical ray coherence terrain rendering.

17 Claims, 12 Drawing Sheets

SYSTEM AND METHOD FOR TERRAIN RENDERING USING A LIMITED MEMORY FOOTPRINT

BACKGROUND OF THE INVENTION

1. Technical Field

The present invention relates in general to a system and method for terrain rendering using a limited memory footprint. More particularly, the present invention relates to a system and method for identifying a subset of data corresponding to vertical rays and generating images using the subset of data.

2. Description of the Related Art

The increase of computer system processing speeds has allowed today's computer systems to perform fairly accurate terrain rendering. In the computer gaming industry, for example, three dimensional terrain rendering is an essential element for providing a "visual reality" to computer games. In addition to the gaming industry, three-dimensional terrain-rendering is utilized in other fields, such as flight simulation and environmental planning.

Software developers may use "ray casting" for terrain rendering, which produces realistic images. However, ray casting algorithms are inherently complex, and, therefore, require excessive processing time. As an alternative, software developers may use vertical ray coherence for terrain rendering. Vertical ray coherence is an algorithm that exploits the geometric fact that if a plane containing two rays is vertical to a plane of a height map, the two rays may be processed using the same small subset of data from a digital terrain model.

A digital terrain model is a rectangular grid on which a terrain's elevation at each grid point is recorded. A digital terrain model may include numerous grid points, which results in a large data file. In addition, as computer displays screens become larger with higher resolutions, software developers are increasing the digital terrain model's grid resolution in order to provide high-resolution images.

Computer systems typically have a memory hierarchy that includes a disk, main memory, cache, and registers. The larger sections of memory are typically the slowest to access (e.g. disk), while the smaller sections of memory are the quickest to access (e.g. cache and registers). A challenge found with generating images using a digital terrain model, however, is that the size of a digital terrain model is typically too large to load in a computer system's faster memory.

What is needed, therefore, is a system and method to load a subset of a digital terrain model into a computer system's faster memory in order to increase terrain rendering generation performance.

SUMMARY

It has been discovered that the aforementioned challenges are resolved by generating image values using a memory footprint subset that includes adjacent data points that are bound by a start point and an end point. A bottom view ray originates from an eye point and intersects a height map, which creates a memory footprint starting point. Visibility settings or a top view ray provide a memory footprint ending point. The memory footprint starting point, the memory footprint ending point, and vertical ray adjacent data points define a terrain data subset that corresponds to a particular height map vertical ray. The terrain data subset includes height and color information that are used for vertical ray coherence terrain rendering.

A processor identifies an eye point and a look-at vector from which to generate an image. The eye point corresponds to a location at which a user views a view screen. The look-at vector is a vector that originates at the eye point, is perpendicular to the view screen, and pierces the center of the view screen. Using the eye point, the processor derives attributes of the location of a down point. The down point may land either on or off a height map. In addition, the processor derives the view screen, such as its location from the eye point, its size, and its angle relative to the height map.

Once the processor derives the view screen, the processor selects a vertical plane sampling density and identifies a list of interesting vertical half-planes. An interesting vertical half-plane is a half-plane that is perpendicular to the height map, travels through the down point, and intersects the view screen. The set of all rays within an interesting vertical half-plane that intersect the view screen is the universe from which the vertical rays are selected. Some of these vertical rays will intersect the height map, and paint terrain. Others will miss the height map, and will paint sky. The intersection of the interesting vertical half-plane with the height map is referred to as the height map vertical ray. The intersection of the interesting vertical half-plane with the view screen is referred to as the view screen vertical ray.

The processor uses the view screen vertical ray and the eye point to identify a memory footprint starting point and a memory footprint ending point on the height map vertical ray. The processor generates a bottom ray that originates at the eye point, travels through the view screen vertical ray at the bottom of the view screen, and intersects the height map along the height map vertical ray, thus creating a start point.

In addition, the processor generates a top ray that originates at the eye point, travels through the view screen vertical ray at the top of the view screen, and intersects the height map along the height map vertical ray, thus creating an end point. If the end point falls outside of the height map, the processor uses environmental data (i.e. cloud coverage) in order to generate images between the end of the height map and the end point along the height map vertical ray. Once the start point and the end point are identified, the processor collects data points that are adjacent to the height map vertical ray and between the start point and the end point, resulting in a memory footprint subset. Once the processor collects the memory footprint subset, the processor generates image values using the memory footprint subset for a plurality of height map intersection points that lie along the corresponding height map vertical ray.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
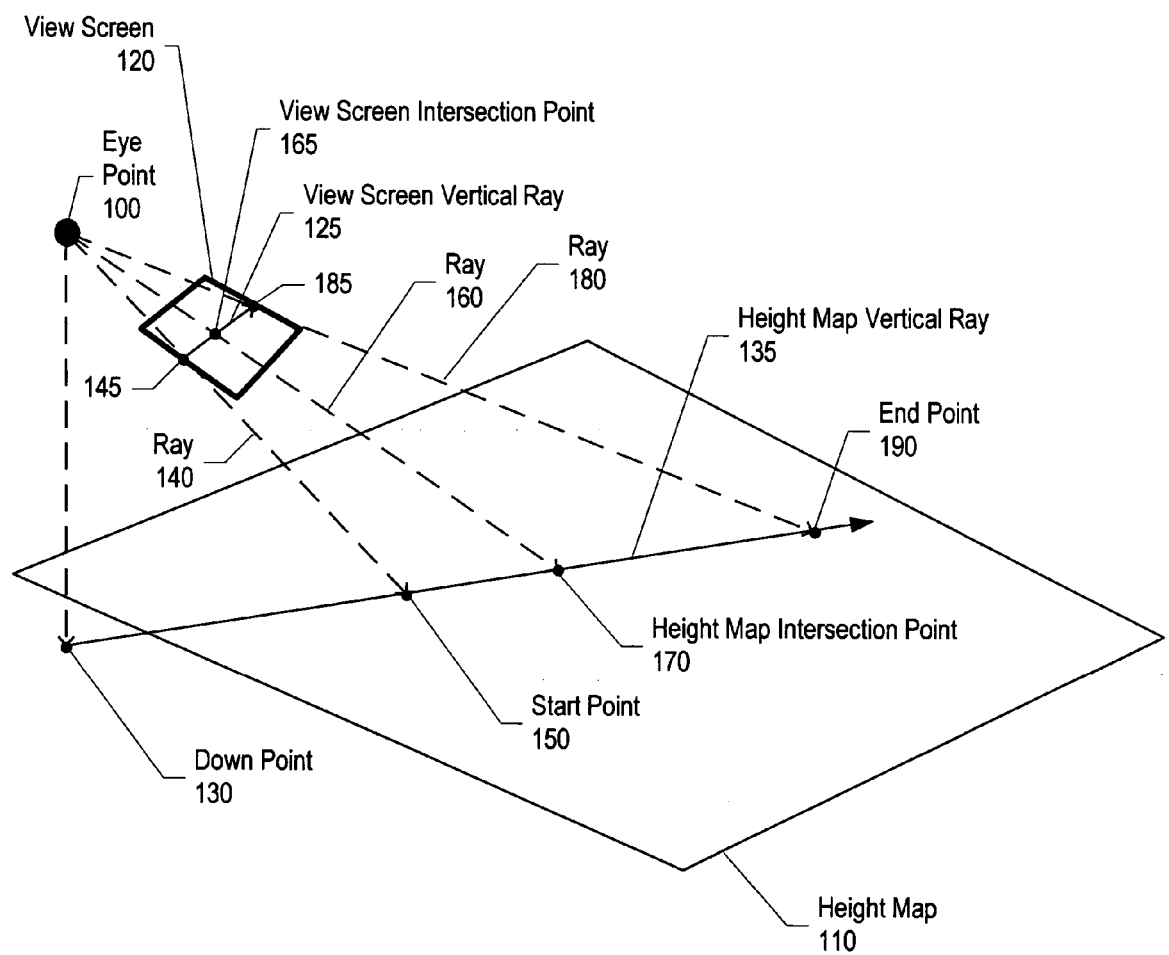
FIG. 1 is a diagram showing a plurality of rays that originate from an eye point, tracing through a view screen, and intersecting a height map.

FIG. 1 is a diagram showing a plurality of rays that originate from an eye point, tracing through a view screen, and intersecting a height map. A processor generates images that correspond to the height map intersections using a limited memory footprint. Height map 110 includes a plurality of data points that are organized by a grid, whereby each data point includes height data.

During terrain rendering, a processor identifies eye point 100 and a look-at vector. Eye point 100 corresponds to a Location at which a user views view screen 120 and the look-at vector is a vector that originates at eye point 100 and pierces the center of view screen 120. Using eye point 100, the processor derives the location of down point 130. Down point 130 may land either on or off height map 110. In addition, the processor derives view screen 120, such as its location from eye point 100, its size, and its angle relative to height map 110.

Once the processor derives view screen 120, the processor selects a vertical plane sampling density and identifies a list of interesting vertical half planes. An interesting vertical half plane is a half plane that is perpendicular to height map 110, travels through down point 130, and travels through view screen 120. A processor is not required to generate image pixels that correspond to vertical half planes that do not travel through view screen 120.

The place at which an interesting vertical half plane intersects height map 110 creates a height map vertical ray, such as height map vertical ray 135. In addition, the place at which the interesting vertical half plane intersects view screen 120 creates a view screen vertical ray, such as view screen vertical ray 125.

The processor uses view screen vertical ray 125 and eye point 100 to identify a memory footprint starting point and a memory footprint ending point that corresponds to height map vertical ray 135. The processor generates ray 140 which originates at eye point 100, travels through view screen vertical ray 125 at the bottom of view screen 120 (point 145), and intersects height map 110 along height map vertical ray 135 at start point 150. Data below start point 150 is inconsequential to generating a view in the particular example shown in FIG. 1.

In addition, the processor generates ray 180 which originates at eye point 100, travels through view screen vertical ray 125 at the top of view screen 120 (point 185), and intersects height map 110 along height map vertical ray 135 at end point 190. Data above end point 190 is inconsequential to generating a view in the particular example shown in FIG. 1. If end point 190 falls outside of height map 110, the processor uses visibility settings (i.e. cloud coverage) in order to generate images between the end of height map 110 and end point 190 along height map vertical ray 135.

Figure 2A:
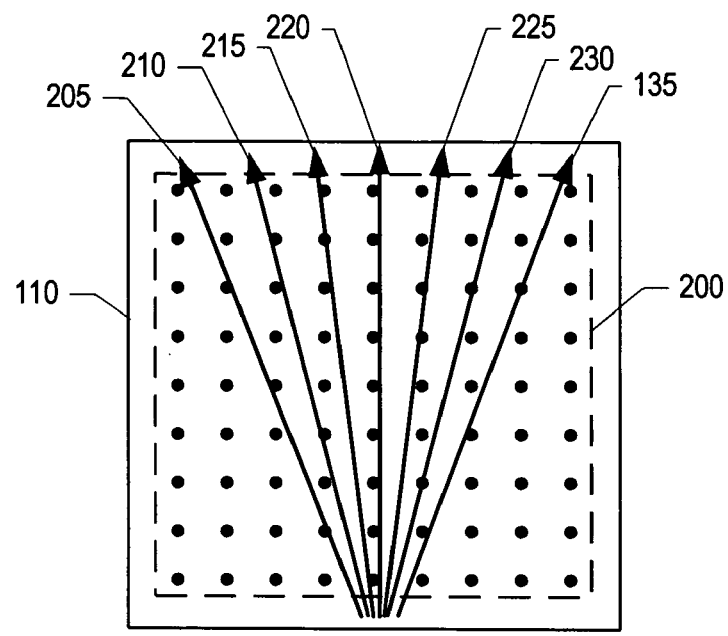
FIG. 2A is diagram showing a plurality of height map vertical rays transposed along a height map.
Figure 2B:
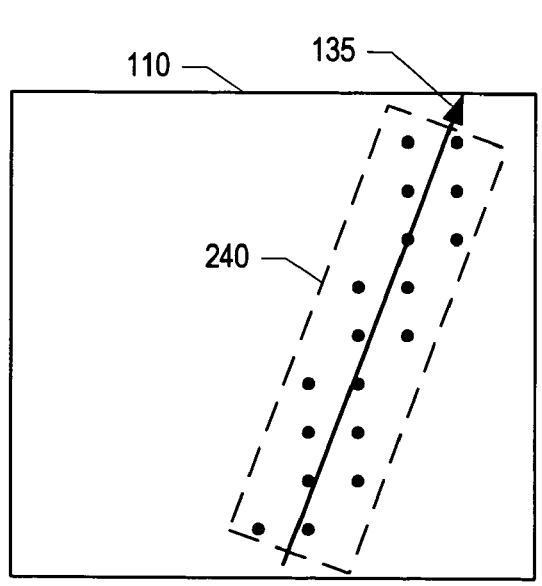
FIG. 2B is diagram showing adjacent data points that correspond to a particular height map vertical ray.
Figure 2C:
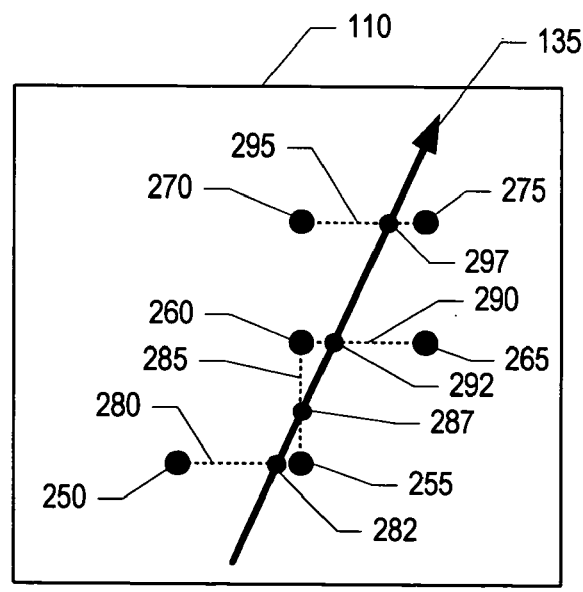
FIG. 2C is diagram showing scan-line intersection points that correspond to a height map vertical ray.
Figure 6:
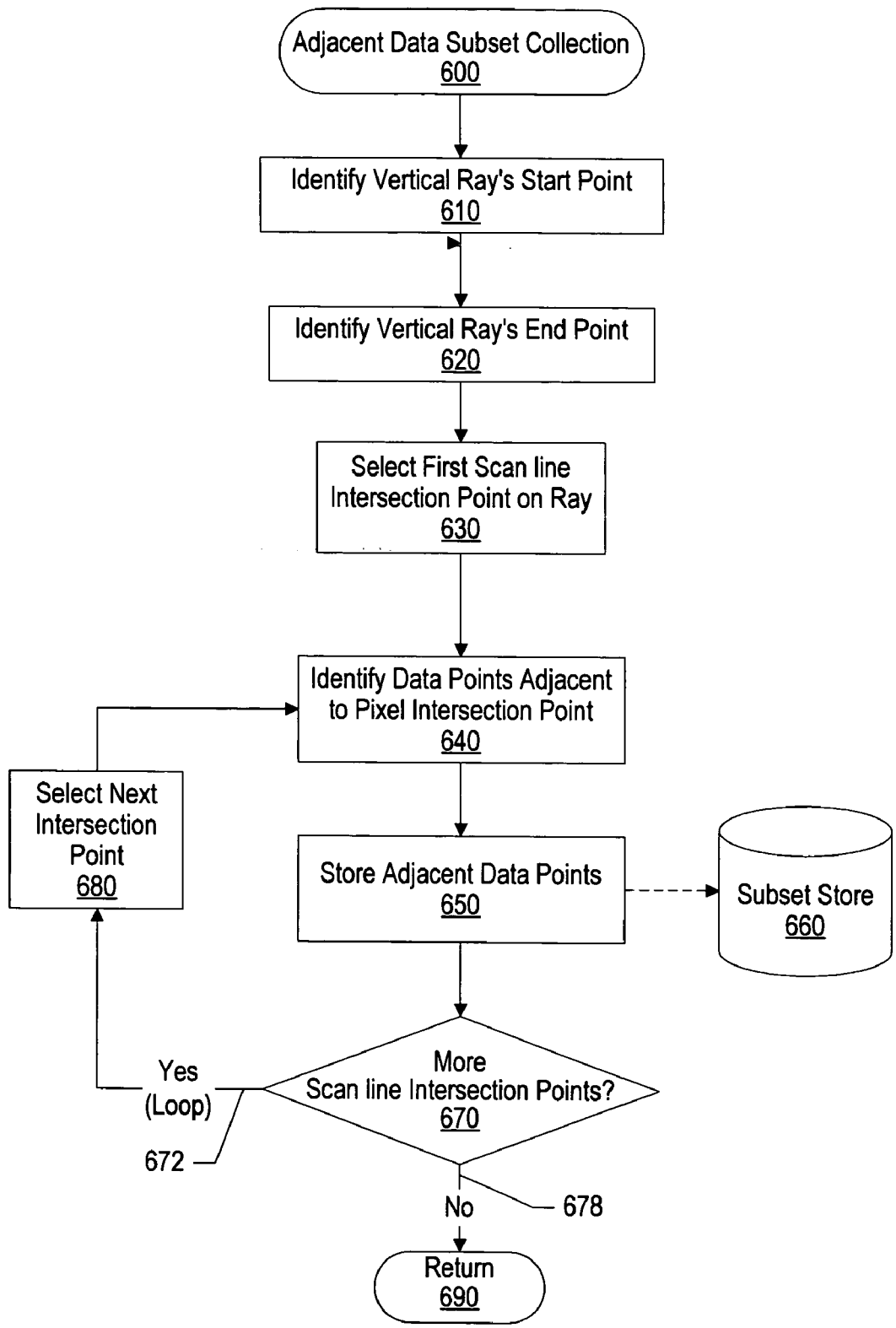
FIG. 6 is a flowchart showing steps taken in collecting adjacent data points for a particular height map vertical ray.

Once start point 150 and end point 190 are identified, the processor collects data points that are adjacent to height map vertical ray 135 and between start point 150 and end point 190, creating a memory footprint subset (see FIGS. 2B, 2C, 6, and corresponding text for further details regarding adjacent data point collection).

Once the processor collects the memory footprint subset, the processor is ready to generate image values using the memory footprint subset. The processor uses quadrilateral data value calculations and triangular data value calculations in order to generate a blended image value. The processor identifies height map vertical ray 135's minor step, and computes a quadrilateral weighting factor and a triangular weighting factor that the processor uses when it generates a blended image value (see FIG. 4 and corresponding text for further details regarding blending techniques).

The processor selects a pixel sampling density that determines the number of rays that correspond to each pixel that is located along view screen vertical ray 125. For example, the pixel sampling density may be "4" whereby four rays, each starting at eye point 100, are shot at ¼ increments through each view screen pixel. In effect, the rays intersect height map vertical ray 135 at four separate locations. Once the processor selects a pixel sampling density, the processor shoots a ray (i.e. ray 160) through a view screen intersection point (i.e. view screen intersection point 165) along view screen vertical ray 125. In turn, ray 160 intersects height map vertical ray 135 at height map intersection point 170.

Once the processor identifies the location of height map intersection point 170, the processor identifies data points that are adjacent to height map intersection point 170. The adjacent data points are included in the memory footprint subset that the processor previously collected. The processor uses the adjacent data points, the quadrilateral weighting factor, and the triangular weighting factor in order to generate an image value for height map intersection point 170 (see FIG. 7 and corresponding text for further details regarding image generation). The processor generates images for each height map intersection point along each height map vertical ray in order to generate a full image to display on view screen 120.

FIG. 2A is diagram showing a plurality of height map vertical rays transposed along a height map. Height map 110 includes data points 200 which are organized in a grid. Height map 110 is the same as that shown in FIG. 1. When interesting vertical half planes intersect height map 110, height map vertical rays are generated (see FIG. 1 and corresponding text for further details regarding height map vertical ray generation).

Vertical ray 135 is the same as that shown in FIG. 1, and originates at a particular down point. Height map vertical rays 205 through 230 also originate at the same down point but correspond to different interesting vertical half planes. For each height map vertical ray, the processor identifies adjacent data points and stores the adjacent data points in a memory footprint subset (see FIG. 2B and corresponding text for further details regarding adjacent data points).

FIG. 2B is diagram showing adjacent data points that correspond to a particular height map vertical ray. FIG. 2B is the same as FIG. 2A except that it shows only the adjacent data points included in height map 110 that are adjacent to height map vertical ray 135. In addition, the processor may collect only adjacent data points that are between a memory footprint start point and a memory footprint end point (see FIG. 1 and corresponding text for further details regarding start points and end points).

FIG. 2C is diagram showing scan-line intersection points that correspond to a height map vertical ray. Height map vertical ray 135 intersects height map 110 at particular "scan-lines." These scan-lines correspond to the data point "grid." A processor calculates scan-line intersection points upfront using a well-known Bresenham line drawing algorithm. The scan-line intersection points are calculated in order to determine which data points are adjacent to a particular height map vertical ray. FIG. 2C shows that height map vertical ray 135 intersects the shown scan-lines in four points which are point 282, 287, 292, and 297.

Data points 250 through 275 are data points that are adjacent to height map vertical ray 135. A processor uses data points 250 through 275 in order to calculate quadrilateral data values and triangular data values for height map intersection points along height map vertical ray 135.

Figure 3A:
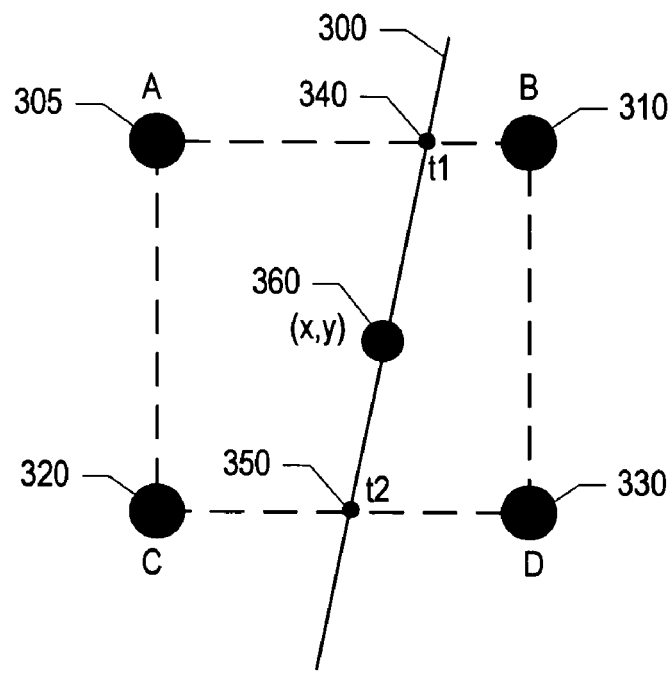
FIG. 3A is a diagram showing a quadrilateral approach to data value calculations.

FIG. 3A is a diagram showing a quadrilateral approach to data value calculations. FIG. 3A shows four adjacent data points that correspond to height map vertical ray 300. The four data points are data points 305 ("A"), 310 ("B"), 320 ("C"), and 330 ("D"). Height map vertical ray 300 intersects two scan lines at scan line intersection points 340 ("t1") and 350 ("t2"). Point 360 is a height map vertical intersection point in which a processor calculates an image values using the data values that correspond to data points 305 through 330. Using standard quadrilateral calculation techniques, the quadrilateral value of point 360 with coordinates "x,y" is calculated as follows:

$$V_{top}=t_1*B+(1-t_1)*A$$

$$V_{bottom}=t_2*D+(1-t_2)*C$$

$$V_{Quad}=y*V_{top}+(1-Y)*V_{bottom}$$

Figure 3B:
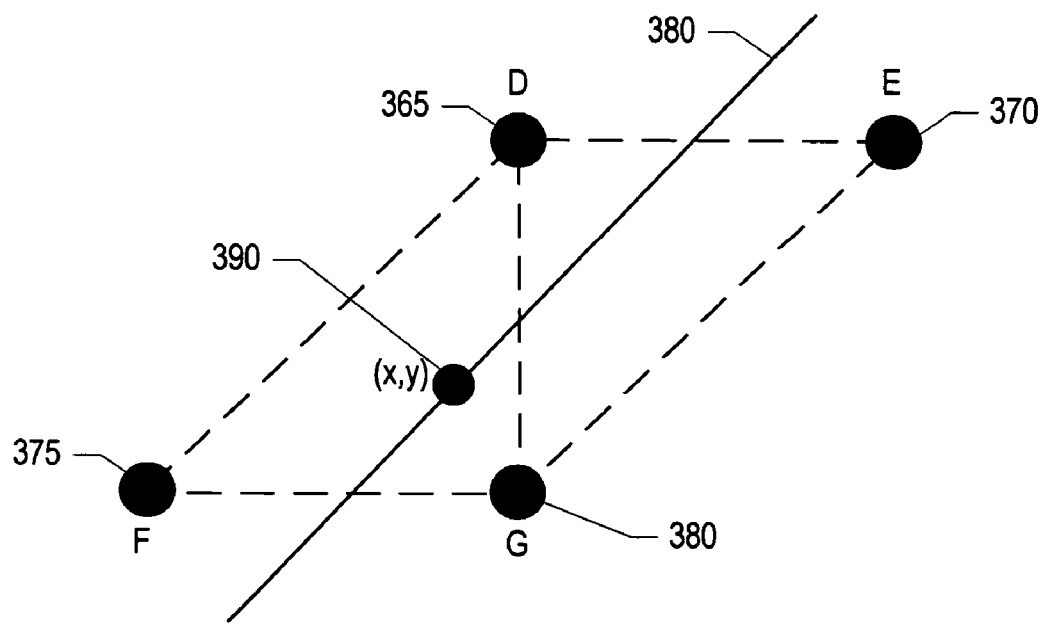
FIG. 3B is a diagram showing a triangular approach to data value calculations.

The value of $V_{Quad}$ is used in conjunction with a triangular data value in order to generate a blended data value for point 360 (see FIG. 3B and corresponding text for further details regarding triangular calculations.

FIG. 3B is a diagram showing a triangular approach to data value calculations. FIG. 3B shows four adjacent data points that correspond to height map vertical ray 380. The four data points are data points 365 ("D"), 370 ("E"), 375 ("F"), and 380 ("G"). Height map vertical ray 385 includes point 390, which is a height map vertical intersection point in which a processor calculates an image using the data values that correspond to data points 365 through 380. Using standard barycentric interpolation, the triangular value of point 390 with coordinates "x,y" is calculated as follows:

$$V_1=y*D$$

$$V_2=(1-X)*F$$

$$V_3=(x-y)*G$$

$$V_{tri}=V_1+V_2+V_3$$

Figure 4:
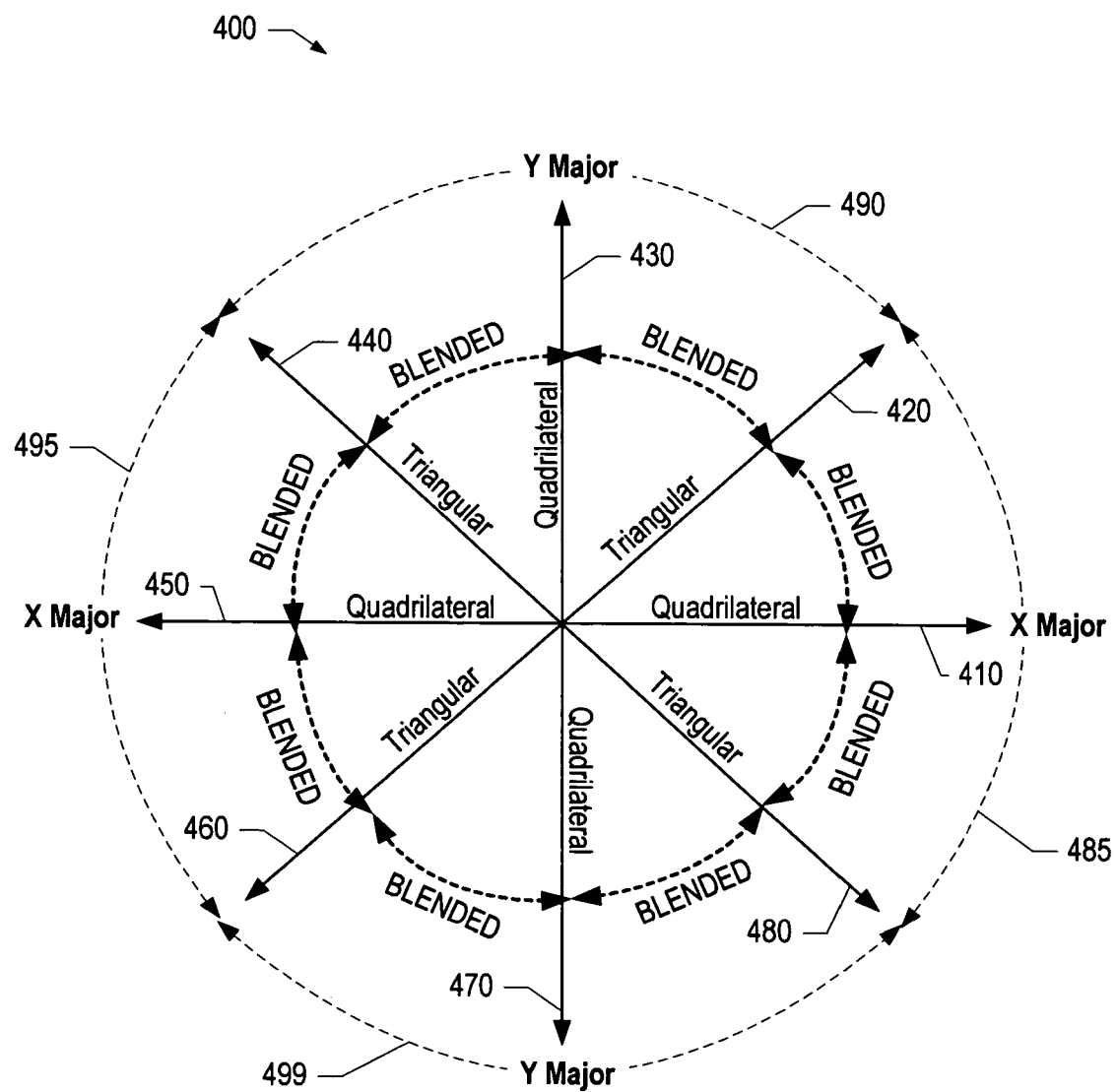
FIG. 4 is a diagram showing when a processor blends quadrilateral and triangular data values to generate image values for height map intersection points that lie on a height map vertical ray.
Figure 7:
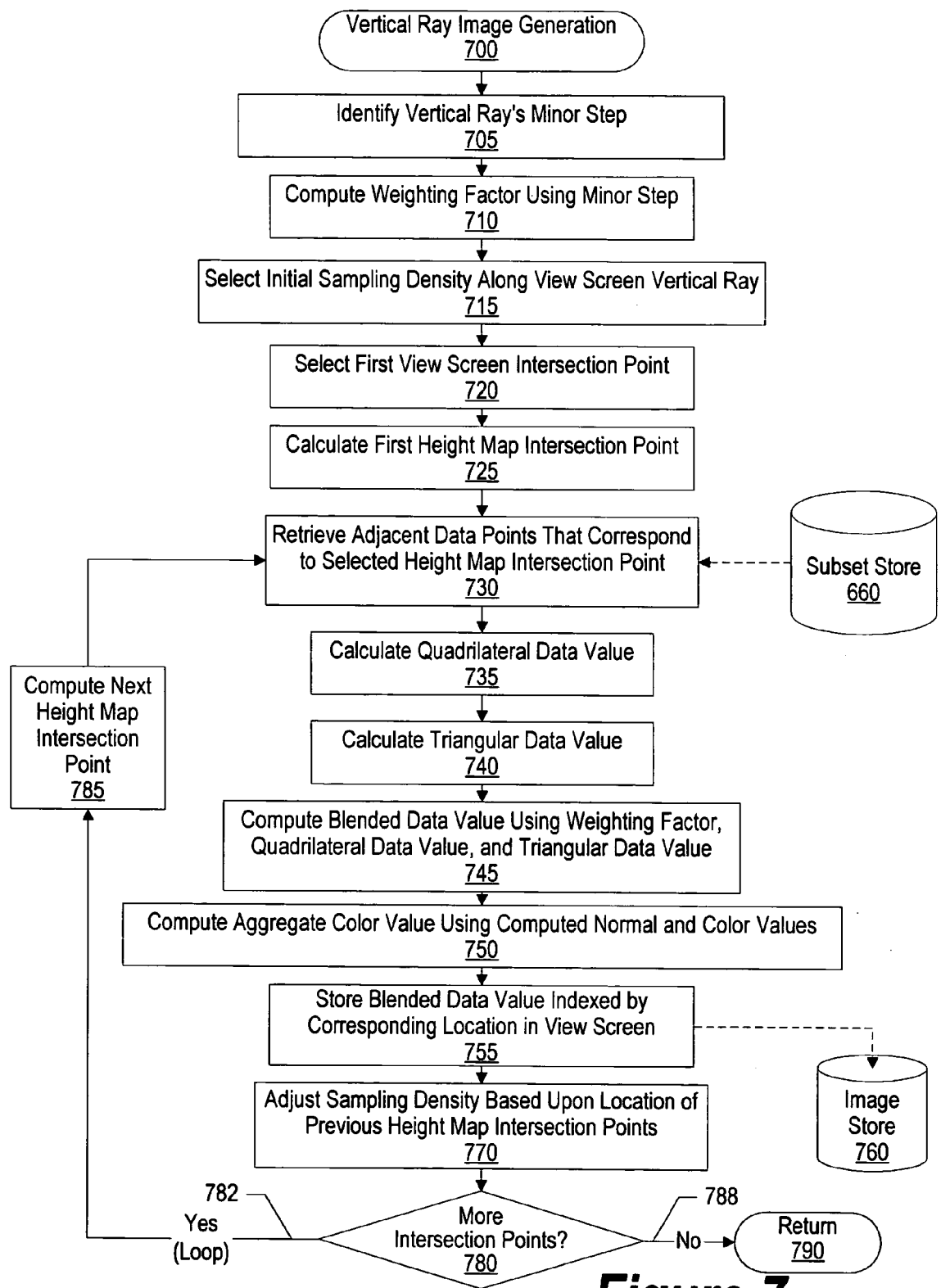
FIG. 7 is a flowchart showing steps taken in generating image values for height map intersection points.

The value of $V_{tri}$ is combined with a quadrilateral value in order to generate a blended value for point 390 (see FIGS. 4, 7, and corresponding text for further details regarding blended data value generation).

FIG. 4 is a diagram showing when a processor blends quadrilateral and triangular data values to generate image values for height map intersection points that lie on a height map vertical ray. In addition, guide 400 includes areas where a processor uses only quadrilateral data values and areas where a processor only uses triangular data values in order to generate image values.

A height map vertical ray has a corresponding major step and minor step. The major step may be "Y" major or "X" major, depending upon the "angle" of the height map vertical ray. A height map vertical ray is considered "Y" major when the height map vertical ray travels in the "Y" direction more than it travels in the "X" direction. In this situation, the height map vertical ray's minor step equals the amount that the ray travels in the "X" direction for every step in the "Y" direction. For example, if a height map vertical ray travels two steps in the "Y" direction for every one step in the "X" direction, the height map vertical ray would be considered "Y" major, and its corresponding minor step is 0.5 (½ step in the "X" direction for every one step in the "Y" direction). Arc 490 and 499 indicate where a height map vertical ray is considered "Y" major.

Conversely, a height map vertical ray is considered "X" major when the height map vertical ray travels in the "X" direction more than it does in the "Y" direction. In this situation, the height map vertical ray's minor step equals the amount that the ray travels in the "Y" direction for every step in the "X" direction. Arc 485 and 495 indicate where a height map vertical ray is considered "X" major. A processor uses the absolute value of a ray's minor step as a weighting factor in order to generate image values. For example, if a height map vertical ray's minor step is −0.6, the processor uses 0.6 as a weighting factor. In this example, if T is the value computed through triangular (barycentric) interpolation, and Q is the value computed through quadrilateral interpolation, the final value would thus be:

$$V=0.6*T+(1.0-0.6)*Q$$

Guide 400 includes eight axes that are axis 410 through axis 480. Axis 410 corresponds to a height map vertical ray traveling zero steps in the "Y" direction for every one step in the "X" direction. In this situation, a processor uses only quadrilateral values to calculate image values that lie along the particular height map vertical ray. Axis 420 corresponds to a height map vertical ray that travels one step in the "Y" direction for every one step in the "X" direction. In this situation, the height map vertical ray is neither "X" major nor "Y" major, and a processor uses only triangular values to calculate image values that lie along the particular height map vertical ray.

Axis 430 corresponds to a height map vertical ray traveling zero steps in the "X" direction for every one step in the "Y" direction. In this situation, a processor uses only quadrilateral values to calculate image values that lie along the particular height map vertical ray. Axis 440 corresponds to a height map vertical ray traveling minus one step in the "X" direction for every one step in the "Y" direction. In this situation, the height map vertical ray is neither "X" major nor "Y" major, and a processor uses only triangular values to calculate image values that lie along the particular height map vertical ray.

Axis 450 corresponds to a height map vertical ray traveling zero steps in the "Y" direction for every one step in the "X" direction. In this situation, a processor uses only quadrilateral values to calculate image values that lie along the particular height map vertical ray. Axis 460 corresponds to a height map vertical ray traveling minus one step in the "X" direction for every minus one step in the "Y" direction. In this situation, the height map vertical ray is neither "X" major nor "Y" major, and a processor uses only triangular values to calculate image values that lie along the particular height map vertical ray.

Axis 470 corresponds to a height map vertical ray traveling zero steps in the "X" direction for every minus one step in the "Y" direction. In this situation, a processor uses only quadrilateral values to calculate image values that lie along the particular height map vertical ray. Axis 480 corresponds to a height map vertical ray traveling minus one step in the "X" direction for every minus one step in the "Y" direction. In this situation, the height map vertical ray is neither "X" major nor "Y" major, and a processor uses only triangular values to calculate image values that lie along the particular height map vertical ray.

When a height map vertical ray's minor step lies between axes 410 through 480, a processor uses quadrilateral values and triangular values to generate a blended image value (see FIG. 7 and corresponding text for further details regarding blended data value calculations).

Figure 5:
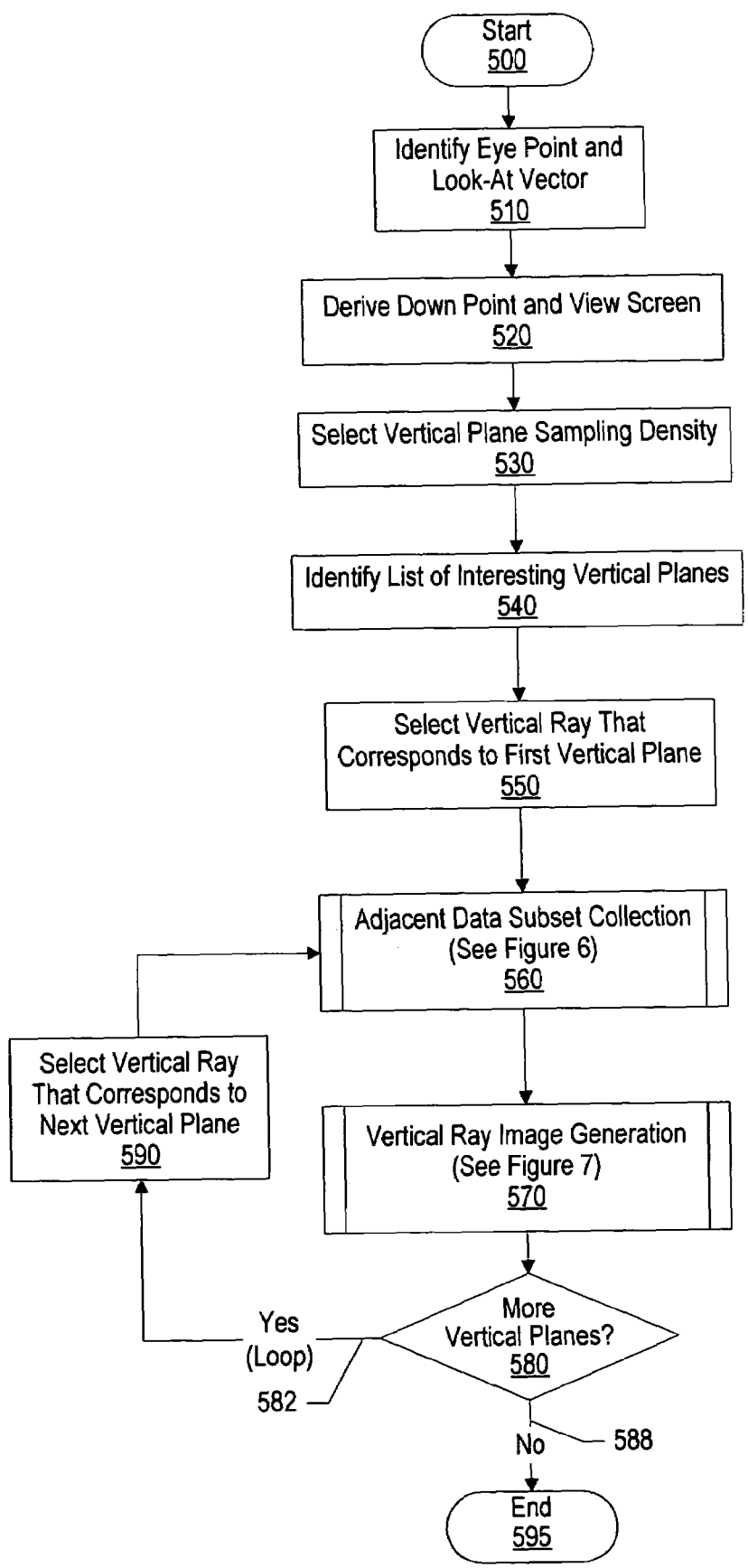
FIG. 5 is a flowchart showing steps taken in generating an image value using a plurality of vertical half planes.

FIG. 5 is a flowchart showing steps taken in generating an image value using a plurality of vertical half planes. Processing commences at 500, whereupon processing identifies an eye point and a look at vector (step 510). The eye point is a point that corresponds to the location of a user, and the look at vector is a vector that starts at the eye point and travels perpendicular to a view screen. At step 520, processing derives a down point and view screen from the eye point and the look-at vector using standard known techniques (see FIG. 1 and corresponding text for further details regarding eye point, down point, and view screen establishment).

At step 530, processing selects a vertical plane sampling density. The vertical plane sampling density corresponds to how many "slices" are used through the view screen which, in turn, corresponds to how many height map vertical rays are used when generating an image. The higher the vertical plane sampling density, the more height map vertical rays which, in turn, create a higher quality image. Processing identifies a list of interesting vertical half planes at step 540. The interesting vertical half planes are vertical half planes that intersect the view screen.

At step 550, processing identifies a height map vertical ray that corresponds to the first interesting vertical half plane. A height map vertical ray is a ray on a height map that corresponds to the vertical half plane (see FIG. 1 and corresponding text for further details regarding height map vertical rays). Processing identifies and stores data points that are adjacent to the height map vertical ray (pre-defined process block 560, see FIG. 6 and corresponding text for further details). Processing then generates an image for a plurality of height map intersection points using the stored adjacent data points (pre-defined process block 570, see FIG. 7 and corresponding text for further details).

A determination is made as to whether there are more interesting vertical half planes to process (decision 580). If there are more interesting vertical half planes, decision 580 branches to "Yes" branch 582 which loops back to select (step 590) and process the next vertical plane. This looping continues until there are no more vertical half planes to process, at which point decision 580 branches to "No" branch 588, and processing ends at 595.

FIG. 6 is a flowchart showing steps taken in collecting adjacent data points for a particular height map vertical ray. Processing commences at 600, whereupon processing identifies a height map vertical ray's memory footprint start point (i.e. start point). The start point is typically defined by the location at which a ray intersects a height map, whereby the ray originates from an eye point and travels through the bottom of a view screen (see FIG. 1 and corresponding text for further details regarding start point identification).

Processing identifies the height map vertical ray's memory footprint end point (i.e. end point) at step 620. The end point is defined either by the location at which the height map ends or the location at which a ray intersects a height map, whereby the ray originates from an eye point and travels through the top of a view screen (see FIG. 1 and corresponding text for further details regarding end point identification).

Processing selects a first scan-line intersection point on the height map vertical ray that is in between the start point and end point (step 630). A scan-line intersection point is a point on the height map vertical ray that intersects a scan-line on the height map (see FIG. 2C and corresponding text for further details regarding scan-lines). Processing identifies data points that are adjacent to the first scan-line intersection point at step 640, and stores the adjacent data points in subset store 660 at step 650. In one embodiment, instead of storing the actual adjacent data points, processing stores the location of the adjacent data points (e.g. a pointer). Subset store 660 may be stored on a nonvolatile storage area, such as a computer hard drive.

A determination is made as to whether there are more scan-line intersection points to process that are between the start point and the end point (decision 670). If there are more scan-line intersection points to process, decision 670 branches to "Yes" branch 672 which loops back to select (step 680) and process the next scan-line intersection point. This looping continues until there are no more scan-line intersection points to process, at which point decision 670 branches to "No" branch 678 whereupon processing returns at 690.

FIG. 7 is a flowchart showing steps taken in generating image values for height map intersection points. Processing commences at 700, whereupon processing identifies a height map vertical ray's minor step (step 705). A vertical ray has a corresponding major step and minor step. If a vertical ray travels in the Y direction more than the X direction, the ray is considered Y major and the minor step is how much the vertical ray travels in the X direction for every one step in tie Y direction (i.e. major step). Conversely, if a vertical ray travels in the X direction more than the Y direction, the ray is considered X major and the minor step is how much the vertical ray travels in the Y direction for every one step in the X direction (i.e. major step) (see FIG. 4 and corresponding text for further details regarding minor steps).

Processing computes a quadrilateral weighting factor and a triangular weighting factor using the minor step at step 710. The association between the minor step, the quadrilateral weighting factor and the triangular weighting factor is as follows:

triangular weighting factor=minor step quadrilateral weighting factor=1−minor step Therefore, the following conditions apply to the minor step (ms) in relation to quadrilateral and triangular weighting:

If ms=0, then only quadrilateral weighting
If 0<ms<0.5, then more quadrilateral weighting
If ms=0.5, then equal quadrilateral and triangular weighting
If 0.5<ms<1, then more triangular weighting
If ms=1, then only triangular weighting At step 715, processing selects an initial pixel sampling density along a view screen vertical ray. A view screen vertical ray is a ray along a view screen that corresponds to a vertical half plane. The pixel sampling density corresponds to how many view screen intersection points on a per pixel basis that processing should identify corresponding height map intersection points (see FIG. 1 and corresponding text for further details regarding view screen vertical rays, view screen intersection points, and height map intersection points).

Processing selects a first view screen intersection point at step 720. In one embodiment, processing selects a plurality of view screen intersection points. In this embodiment, a heterogeneous computer system may be used, such as that shown in FIGS. 10 and 11, in order to process four view screen intersection points in parallel.

At step 725, processing uses the selected view screen intersection point to calculate a height map intersection point. As one skilled in the art can appreciate, well know ray tracing techniques may be used to perform the calculation. Processing retrieves adjacent data points from subset store 660 that correspond to the calculated height map intersection point (step 730). The adjacent data points were previously stored in subset store 660 during adjacent data point collection (see FIG. 6 and corresponding text for further details).

At step 735, processing uses the adjacent data points to calculate a quadrilateral data value. The quadrilateral data value includes both a normal value and a color value (see FIG. 3A and corresponding text for further details regarding quadrilateral data value calculations). At step 740, processing uses the adjacent data points to calculate a triangular data value. The triangular data value also includes both a normal value and a color value (see FIG. 3B and corresponding text for further details regarding triangular data value calculations).

Processing computes a blended data value using the triangular weighting factor (twf), the quadrilateral weighting factor (twf), the quadrilateral data value (qdv) and the triangular data value (tdv) as follows:

Blended Data Value=$twf*tdv+qwf*qdv$

Processing calculates a blended data value for both normal values and color values. Processing computes an aggregate color value using the blended normal values and the blended color values at step 750, and stores the aggregate blended data value in image store 760 at step 755. Image store 760 may be stored on a nonvolatile storage area, such as a computer hard drive.

At step 770, processing adjusts the pixel sampling density based upon the location of the previously used height map intersection points. For example, if the height map intersection points were far apart, processing increases the pixel sampling density, which results in increased (and closer) height map intersection points.

A determination is made as to whether there are more view screen intersection points to process (step 780). If there are more view screen intersection points to process, decision 780 branches to "Yes" branch 782 which loops back to select (step 785) and process the next view screen intersection point. This looping continues until there are no more view screen intersection points to process, at which point decision 780 branches to "No" branch 788 whereupon processing returns at 790.

Figure 8:
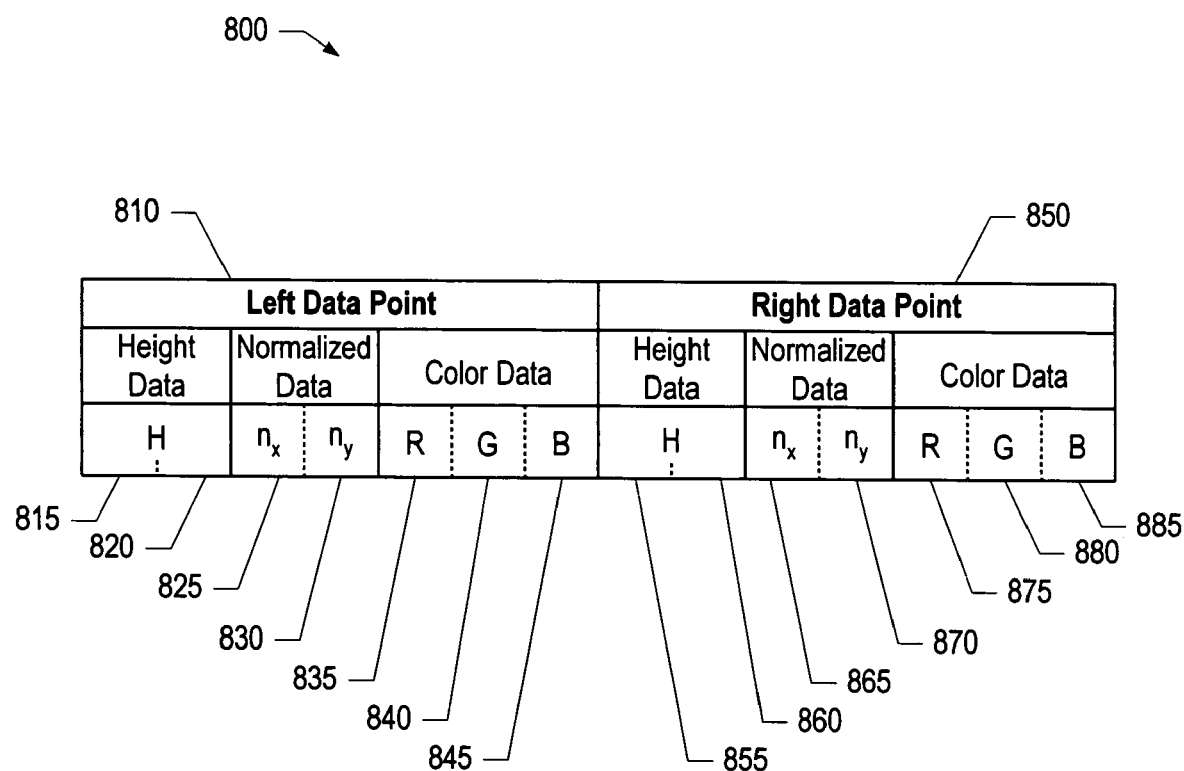
FIG. 8 is a diagram of a cache optimized data format.
Figure 10:
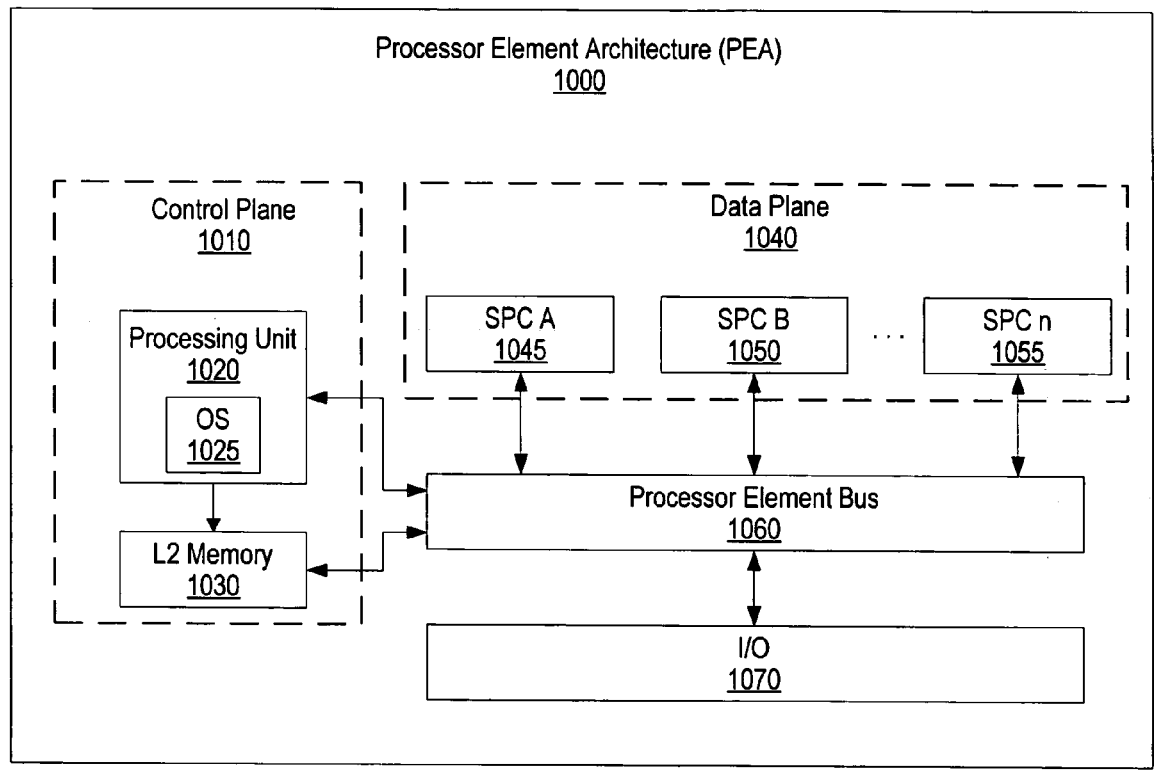
FIG. 10 is a diagram showing a processor element architecture that includes a plurality of heterogeneous processors.

FIG. 8 is a diagram of a cache optimized data format. Data stream 800 is specifically designed to include normalized data, whereby the data stream is optimized to a processor's memory configuration for the processor to generate image values, such as one of the synergistic processing complexes that are shown in FIGS. 10 and 11.

Data stream 800 includes data values for two adjacent data points, which are included in left data point 810 and right data point 850. Left data point 810 includes height data in bytes 815 and 820. Bytes 825 and 830 include normalized x and y data values, respectively, for left data point 810. The normalized data values may be generated for left data point 810 during system initialization so as to not require computation time when the system generates image values. Bytes 835, 840, and 845 include color data for red color, green color, and blue color, respectively.

Right data point 850 includes the same byte locations as left data point 810. Right data point 850's height data is included in bytes 855 and 860. Bytes 865 and 870 include normalized x and y data values, respectively, for right data point 850. Again, the normalized data may be generated for right data point 850 during system initialization so as to not require computation time when the system generates image values. Bytes 875, 880, and 885 include color data for red color, green color, and blue color, respectively.

Figure 9:
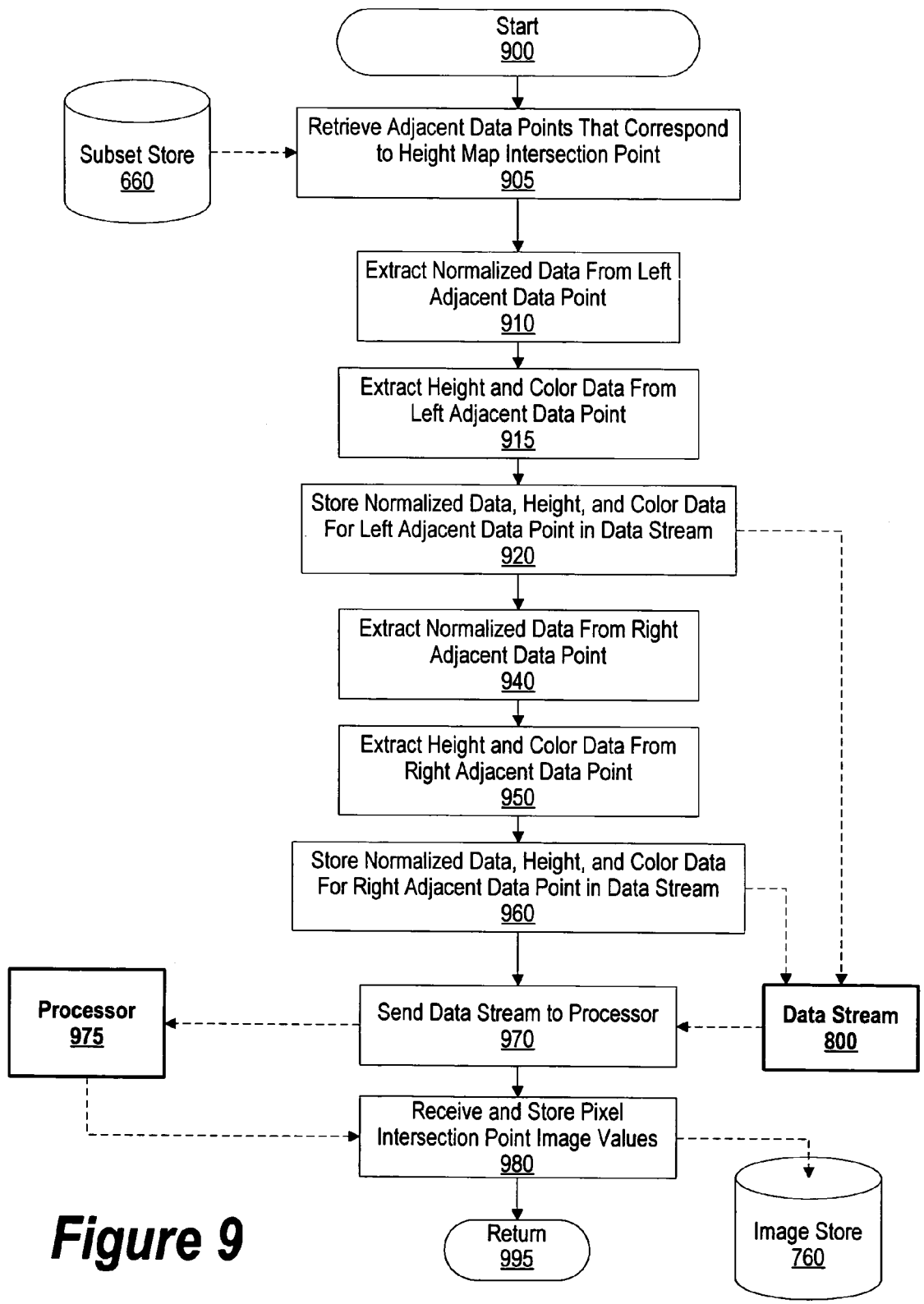
FIG. 9 is a flowchart showing steps taken in storing data in a cache optimized data stream and sending the data stream to a processor for processing.

FIG. 9 is a flowchart showing steps taken in storing data in a cache optimized data stream and sending the data stream to a processor for processing. Processing commences at 900, whereupon processing retrieves adjacent data points that correspond to a height map intersection point (step 905). The height map intersection point has two corresponding adjacent data points which are a left data point and a right data point. In one embodiment, a height map intersection point may have four adjacent data points which are an upper left, and upper right, a lower left, and a lower right data point.

At step 910, processing extracts normalized data from the left adjacent data point. The left adjacent data point's normalized data may be calculated prior to identifying the adjacent data points. For example, when a software program initializes, the software program may generate normalized data for each height map data point using their adjacent data points, and then storing the normalized data in each data point.

Processing extracts height and color data from the left adjacent data point at step 915. The height data may be two bytes in length and the color may be three bytes in length whereby each color byte corresponds to a red color, a green color, and a blue color. At step 920, processing stores the left adjacent data point's normalized data, height data, and color data in data stream 800. Data stream 800 is specifically designed to function with processor 975's limited cache size and is the same as that shown in FIG. 8.

At step 940, processing extracts normalized data from the right adjacent data point. Again, the right adjacent data point's normalized data may be calculated prior to identifying the adjacent data points. Processing extracts height and color data from the right adjacent data point at step 950 and, at step 960, processing stores the right adjacent data point's normalized data, height data, and color data in data stream 800.

Processing sends data stream 800 to processor 975 at step 970. Processor 975 has a limited cache size such as one of the synergistic processing complexes shown in FIGS. 10 and 11. Processor 975 calculates a height map intersection point image value using the data that is included in data stream 800 (see FIG. 7 and corresponding text for further details regarding height map intersection point image value generation). Processing receives the height map intersection point image values from processor 975 at step 980, and stores the image values in image store 760. Image store 760 is the same as that shown in FIG. 7, and may be stored on a nonvolatile storage area, such as a computer hard drive. Processing ends at 995.

FIG. 10 is a diagram showing a processor element architecture that includes a plurality of heterogeneous processors. The heterogeneous processors share a common memory and a common bus. Processor element architecture (PEA) 1000 sends and receives information to/from external devices through input output 1070, and distributes the information to control plane 1010 and data plane 1040 using processor element bus 1060. Control plane 1010 manages PEA 1000 and distributes work to data plane 1040.

Control plane 1010 includes processing unit 1020 which runs operating system (OS) 1025. For example, processing unit 1020 may be a Power PC core that is embedded in PEA 1000 and OS 1025 may be a Linux operating system. Processing unit 1020 manages a common memory map table for PEA 1000. The memory map table corresponds to memory locations included in PEA 1000, such as L2 memory 1030 as well as non-private memory included in data plane 1040 (see FIG. 11A, 11B, and corresponding text for further details regarding memory mapping).

Data plane 1040 includes Synergistic Processing Complex's (SPC) 1045, 1050, and 1055. Each SPC is used to process data information and each SPC may have different instruction sets. For example, PEA 1000 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU) which is a processing core, such as a digital signal processor, a microcontroller, a microprocessor, or a combination of these cores.

SPC 1045, 1050, and 1055 are connected to processor element bus 1060 which passes information between control plane 1010, data plane 1040, and input/output 1070. Bus 1060 is an on-chip coherent multi-processor bus that passes information between I/O 1070, control plane 1010, and data plane 1040. Input/output 1070 includes flexible input-output logic which dynamically assigns interface pins to input output controllers based upon peripheral devices that are connected to PEA 1000. For example, PEA 1000 may be connected to two peripheral devices, such as peripheral A and peripheral B, whereby each peripheral connects to a particular number of input and output pins on PEA 1000. In this example, the flexible input-output logic is configured to route PEA 1000's external input and output pins that are connected to peripheral A to a first input output controller (i.e. IOC A) and route PEA 1000's external input and output pins that are connected to peripheral B to a second input output controller (i.e. IOC B).

Figure 11A:
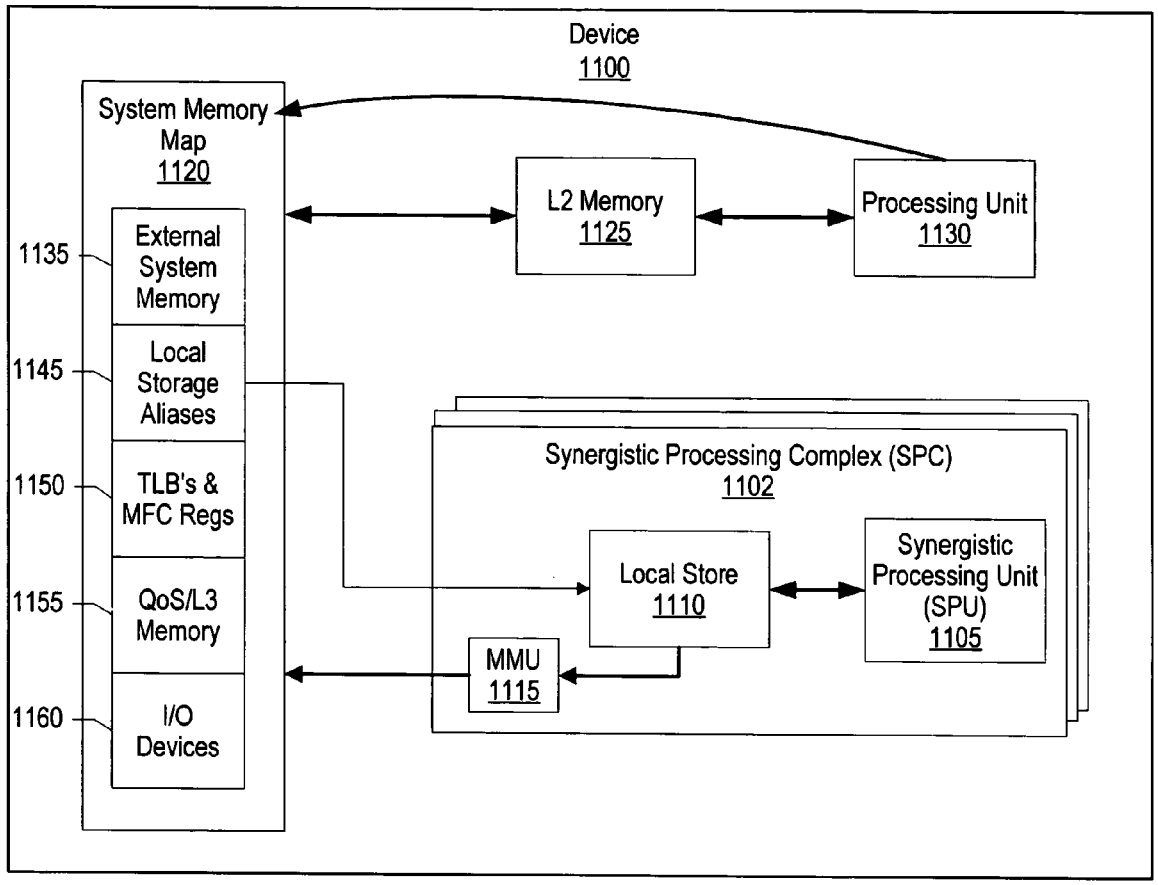
FIG. 11A is a block diagram of a first information handling system capable of implementing the present invention.

FIG. 11A illustrates a first information handling system which is a simplified example of a computer system capable of performing the computing operations described herein. The example in FIG. 11A shows a plurality of heterogeneous processors using a common memory map in order to share memory between the heterogeneous processors. Device 1100 includes processing unit 1130 which executes an operating system for device 1100. Processing unit 1130 is similar to processing unit 4320 shown in FIG. 10. Processing unit 1130 uses system memory map 1120 to allocate memory space throughout device 1100. For example, processing unit 1130 uses system memory map 1120 to identify and allocate memory areas when processing unit 1130 receives a memory request. Processing unit 1130 access L2 memory 1125 for retrieving application and data information. L2 memory 1125 is similar to L2 memory 1030 shown in FIG. 10.

System memory map 1120 separates memory mapping areas into regions which are regions 1135, 1145, 1150, 1155, and 1160. Region 1135 is a mapping region for external system memory which may be controlled by a separate input output device. Region 1145 is a mapping region for non-private storage locations corresponding to one or more synergistic processing complexes, such as SPC 1102. SPC 1102 is similar to the SPC's shown in FIG. 10, such as SPC A 1045. SPC 1102 includes local memory; such as local store 1110, whereby portions of the local memory may be allocated to the overall system memory for other processors to access. For example, 1 MB of local store 1110 may be allocated to non-private storage whereby it becomes accessible by other heterogeneous processors. In this example, local storage aliases 1145 manages the 1 MB of nonprivate storage located in local store 1110.

Region 1150 is a mapping region for translation lookaside buffer's (TLB's) and memory flow control (MFC registers. A translation lookaside buffer includes cross-references between virtual address and real addresses of recently referenced pages of memory. The memory flow control provides interface functions between the processor and the bus such as DMA control and synchronization.

Region 1155 is a mapping region for the operating system and is pinned system memory with bandwidth and latency guarantees. Region 1160 is a mapping region for input output devices that are external to device 1100 and are defined by system and input output architectures.

Synergistic processing complex (SPC) 1102 includes synergistic processing unit (SPU) 1105, local store 1110, and memory management unit (MMU) 1115. Processing unit 1130 manages SPU 1105 and processes data in response to processing unit 1130's direction. For example SPU 1105 may be a digital signaling processing core, a microprocessor core, a micro controller core, or a combination of these cores. Local store 1110 is a storage area that SPU 1105 configures for a private storage area and a non-private storage area. For example, if SPU 1105 requires a substantial amount of local memory, SPU 1105 may allocate 100% of local store 1110 to private memory. In another example, if SPU 1105 requires a minimal amount of local memory, SPU 1105 may allocate 10% of local store 1110 to private memory and allocate the remaining 90% of local store 1110 to non-private memory (see FIG. 11B and corresponding text for further details regarding local store configuration).

The portions of local store 1110 that are allocated to non-private memory are managed by system memory map 1120 in region 1145. These non-private memory regions may be accessed by other SPU's or by processing unit 1130. MMU 1115 includes a direct memory access (DMA) function and passes information from local store 1110 to other memory locations within device 1100.

Figure 11B:
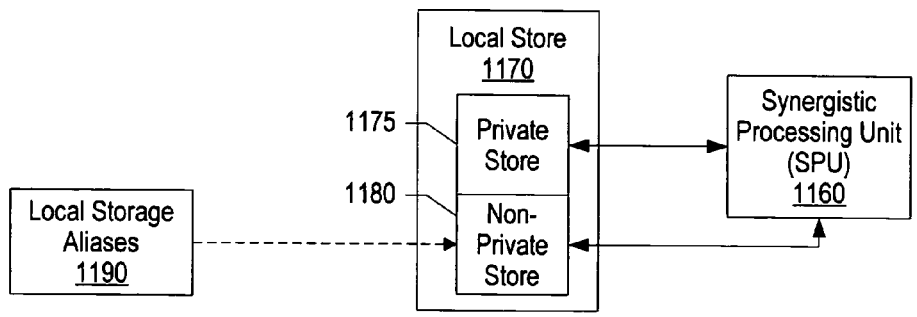
FIG. 11B is a diagram showing a local storage area divided into private memory and non-private memory.

FIG. 11B is a diagram showing a local storage area divided into private memory and non-private memory. During system boot, synergistic processing unit (SPU) 1160 partitions local store 1170 into two regions which are private store 1175 and non-private store 1180. SPU 1160 is similar to SPU 1105 and local store 1170 is similar to local store 1110 that are shown in FIG. 11A. Private store 1175 is accessible by SPU 1160 whereas non-private store 1180 is accessible by SPU 1160 as well as other processing units within a particular device. SPU 1160 uses private store 1175 for fast access to data. For example, SPU 1160 may be responsible for complex computations that require SPU 1160 to quickly access extensive amounts of data that is stored in memory. In this example, SPU 1160 may allocate 100% of local store 1170 to private store 1175 in order to ensure that SPU 1160 has enough local memory to access. In another example, SPU 1160 may not require a large amount of local memory and therefore, may allocate 10% of local store 1170 to private store 1175 and allocate the remaining 90% of local store 1170 to non-private store 1180.

A system memory mapping region, such as local storage aliases 1190, manages portions of local store 1170 that are allocated to non-private storage. Local storage aliases 1190 is similar to local storage aliases 1145 that is shown in FIG. 11A. Local storage aliases 1190 manages non-private storage for each SPU and allows other SPU's to access the non-private storage as well as a device's control processing unit.

Figure 12:
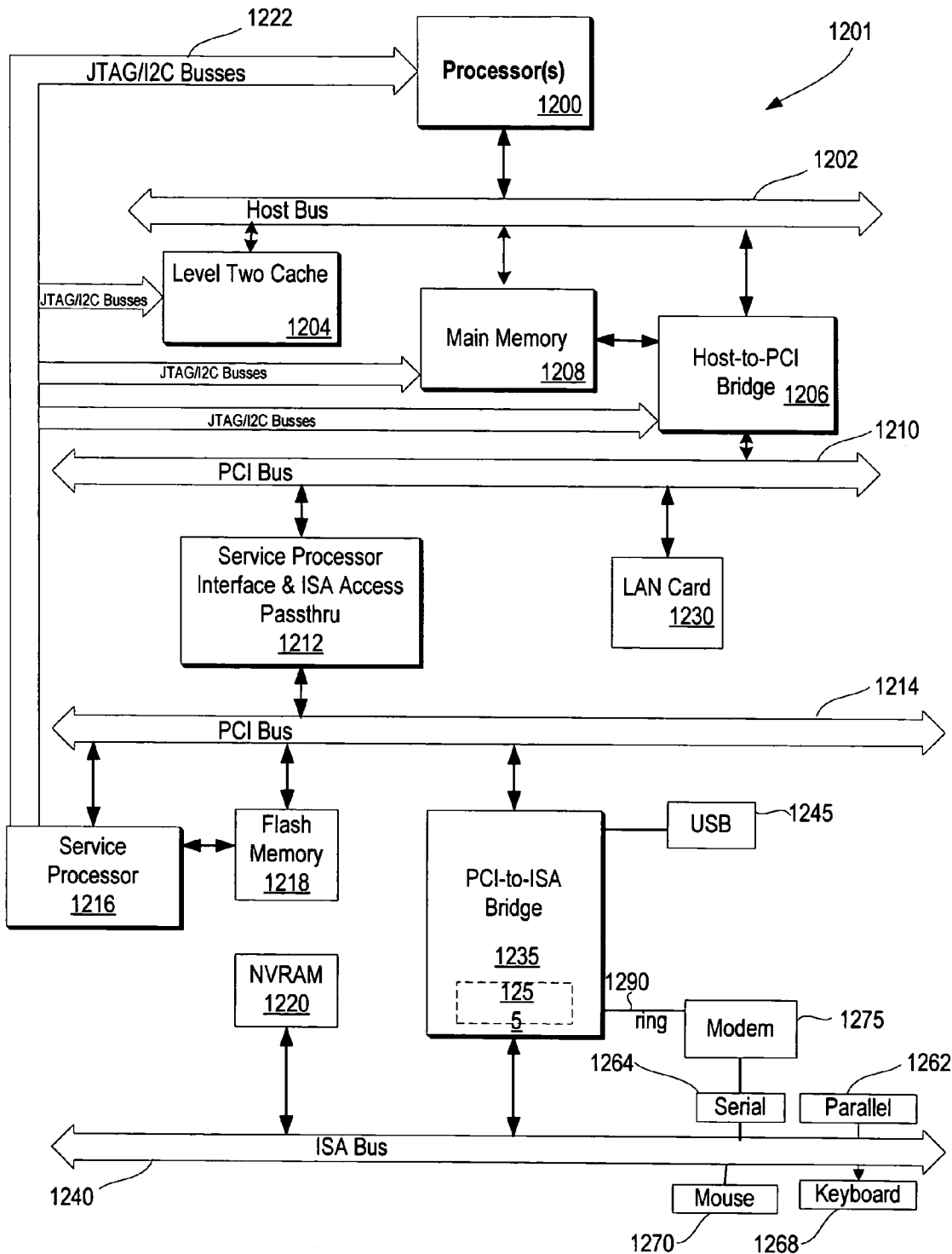
FIG. 12 is a block diagram of a second information handling system capable of implementing the present invention.

FIG. 12 illustrates a second information handling system 1201 which is a simplified example of a computer system capable of performing the computing operations described herein. Computer system 1201 includes processor 1200 which is coupled to host bus 1202. A level two (L2) cache memory 1204 is also coupled to host bus 1202. Host-to-PCI bridge 1206 is coupled to main memory 1208, includes cache memory and main memory control functions, and provides bus control to handle transfers among PCI bus 1210, processor 1200, L2 cache 1204, main memory 1208, and host bus 1202. Main memory 1208 is coupled to Host-to-PCI bridge 1206 as well as host bus 1202. Devices used solely by host processor(s) 1200, such as LAN card 1230, are coupled to PCI bus 1210. Service Processor Interface and ISA Access Pass-through 1212 provides an interface between PCI bus 1210 and PCI bus 1214. In this manner, PCI bus 1214 is insulated from PCI bus 1210. Devices, such as flash memory 1218, are coupled to PCI bus 1214. In one implementation, flash memory 1218 includes BIOS code that incorporates the necessary processor executable code for a variety of low-level system functions and system boot functions.

PCI bus 1214 provides an interface for a variety of devices that are shared by host processor(s) 1200 and Service Processor 1216 including, for example, flash memory 1218. PCI-to-ISA bridge 1235 provides bus control to handle transfers between PCI bus 1214 and ISA bus 1240, universal serial bus (USB) functionality 1245, power management functionality 1255, and can include other functional elements not shown, such as a real-time clock (RTC), DMA control, interrupt support, and system management bus support. Nonvolatile RAM 1220 is attached to ISA Bus 1240. Service Processor 1216 includes JTAG and I2C busses 1222 for communication with processor(s) 1200 during initialization steps. JTAG/I2C busses 1222 are also coupled to L2 cache 1204, Host-to-PCI bridge 1206, and main memory 1208 providing a communications path between the processor, the Service Processor, the L2 cache, the Host-to-PCI bridge, and the main memory. Service Processor 1216 also has access to system power resources for powering down information handling device 1201.

Peripheral devices and input/output (I/O) devices can be attached to various interfaces (e.g., parallel interface 1262, serial interface 1264, keyboard interface 1268, and mouse interface 1270 coupled to ISA bus 1240. Alternatively, many I/O devices can be accommodated by a super I/O controller (not shown) attached to ISA bus 1240.

In order to attach computer system 1201 to another computer system to copy files over a network, LAN card 1230 is coupled to PCI bus 1210. Similarly, to connect computer system 1201 to an ISP to connect to the Internet using a telephone line connection, modem 1275 is connected to serial port 1264 and PCI-to-ISA Bridge 1235.

While the computer system described in FIG. 12 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
identifying a memory footprint starting point, the memory footprint starting point corresponding to the start of a viewable range;
selecting a memory footprint ending point using one or more visibility settings;
retrieving a plurality of adjacent data points that are adjacent to a height map vertical ray that intersects the memory footprint starting point and the memory footprint ending point, wherein the height map vertical ray corresponds to a vertical plane;
selecting a vertical ray sampling density that corresponds to the vertical plane; and
rendering to a display an image using the plurality of adjacent data points.

2. The method of claim 1 further comprising:
selecting a plurality of scan-line intersection points, wherein the plurality of scan-line intersection points corresponds to the plurality of adjacent data points.

3. The method of claim 1 further comprising:
identifying whether the vertical plane intersects a view screen.

4. The method of claim 1 wherein the visibility settings correspond to the end of a height map.

5. The method of claim 1 wherein each of the plurality of adjacent data points include at least one data value that is selected from the group consisting of height data and color data.

6. The method of claim 1 wherein the method is performed using a plurality of heterogeneous processors.

7. A computer program product comprising:
computer readable medium having computer program code, the computer program code being effective to:
identify a memory footprint starting point, the memory footprint starting point corresponding to the start of a viewable range;
select a memory footprint ending point using one or more visibility settings;
retrieve a plurality of adjacent data points that are adjacent to a height map vertical ray that intersects the memory footprint starting point and the memory footprint ending point, wherein the height map vertical ray corresponds to a vertical plane;
selecting a vertical ray sampling density that corresponds to the vertical plane; and
render an image using the plurality of adjacent data points.

8. The program product of claim 7 wherein the computer program code is further effective to:
select a plurality of scan-line intersection points, wherein the plurality of scan-line intersection points corresponds to the plurality of adjacent data points.

9. The program product of claim 7 wherein the computer program code is further effective to:
identify whether the vertical plane intersects a view screen.

10. The program product of claim 7 wherein the visibility settings correspond to the end of a height map.

11. The program product of claim 7 wherein each of the plurality of adjacent data points include at least one data value that is selected from the group consisting of height data and color data.

12. The program product of claim 7 wherein the computer program code uses a plurality of heterogeneous processors.

13. An information handling system comprising:
a display;
one or more processors;
a memory accessible by the processors;
one or more nonvolatile storage devices accessible by the processors; and
a terrain-rendering tool for rendering images, the terrain rendering tool comprising software code effective to:
identify a memory footprint starting point, the memory footprint starting point corresponding to the start of a viewable range;
select a memory footprint ending point using one or more visibility settings;
retrieve a plurality of adjacent data points from one of the nonvolatile storage devices that are adjacent to a height map vertical ray that intersects the memory footprint starting point and the memory footprint ending point, wherein the height map vertical ray corresponds to a vertical plane;
selecting a vertical ray sampling density that corresponds to the vertical plane; and
render an image on the display using the plurality of adjacent data points.

14. The information handling system of claim 13 wherein the software code is further effective to:
select a plurality of scan-line intersection points located in one of the nonvolatile storage devices, wherein the plurality of scan-line intersection points corresponds to the plurality of adjacent data points.

15. The information handling system of claim 12 wherein the software code is further effective to:
identify whether the vertical plane intersects a view screen that corresponds to the display.

16. The information handling system of claim 13 wherein the visibility settings correspond to the end of a height map.

17. The information handling system of claim 13 wherein each of the plurality of adjacent data points include at least one data value that is selected from the group consisting of height data and color data.

* * * * *

UNITED STATES PATENT AND TRADEMARK OFFICE
CERTIFICATE OF CORRECTION

| | |
|---|---|
| PATENT NO. | : 7,212,199 B2 |
| APPLICATION NO. | : 10/875946 |
| DATED | : May 1, 2007 |
| INVENTOR(S) | : Fossum et al. |

It is certified that error appears in the above-identified patent and that said Letters Patent is hereby corrected as shown below:

Claim 15, column 16, line 44, please delete "12" and insert --13--.

Signed and Sealed this

Twelfth Day of June, 2007

JON W. DUDAS
*Director of the United States Patent and Trademark Office*